United States Patent

[11] 3,584,683

| [72] | Inventor | Jerry D. Gordon<br>10749 East 11th St., Tulsa, Okla. 74128 |
|------|----------|---|
| [21] | Appl. No. | 819,241 |
| [22] | Filed | Apr. 25, 1969 |
| [45] | Patented | June 15, 1971 |

[54] THERMAL SPIKE
4 Claims, 4 Drawing Figs.

[52] U.S. Cl..................................................... 165/185,
17/1, 99/419
[51] Int. Cl..................................................... F28f 7/00
[50] Field of Search............................................. 99/419,
420—421, 358, 442; 30/322; 211/125; 294/49, 61;
112/48, 169; 128/339; 165/185; 17/1 S

[56] References Cited
UNITED STATES PATENTS

| Des. 186,902 | 12/1959 | Fried | 17/1 (S) UX |
| 2,651,251 | 9/1953 | Brown | 99/419 |
| 2,835,480 | 5/1958 | Perez | 99/419 X |
| 3,010,385 | 11/1961 | Rappaport | 99/421 (HV) |
| 3,280,907 | 10/1966 | Hoffman | 165/185 |

*Primary Examiner*—Walter A. Scheel
*Assistant Examiner*—Arthur O. Henderson
*Attorney*—Young & Thompson ABSTRACT: A thermal spike for improving the conduction of heat into the interior of a piece of meat during cooking has a protruding portion characterized by a plurality of discs of the same diameter that provide increased surface area and also a handgrip, the discs being spaced apart by annular portions that increase in diameter in the direction of the point. A limiting washer limits penetration of the spike, and the spike has a rounded end for pushing against. The spike is a highly conductive metal clad with stainless steel.

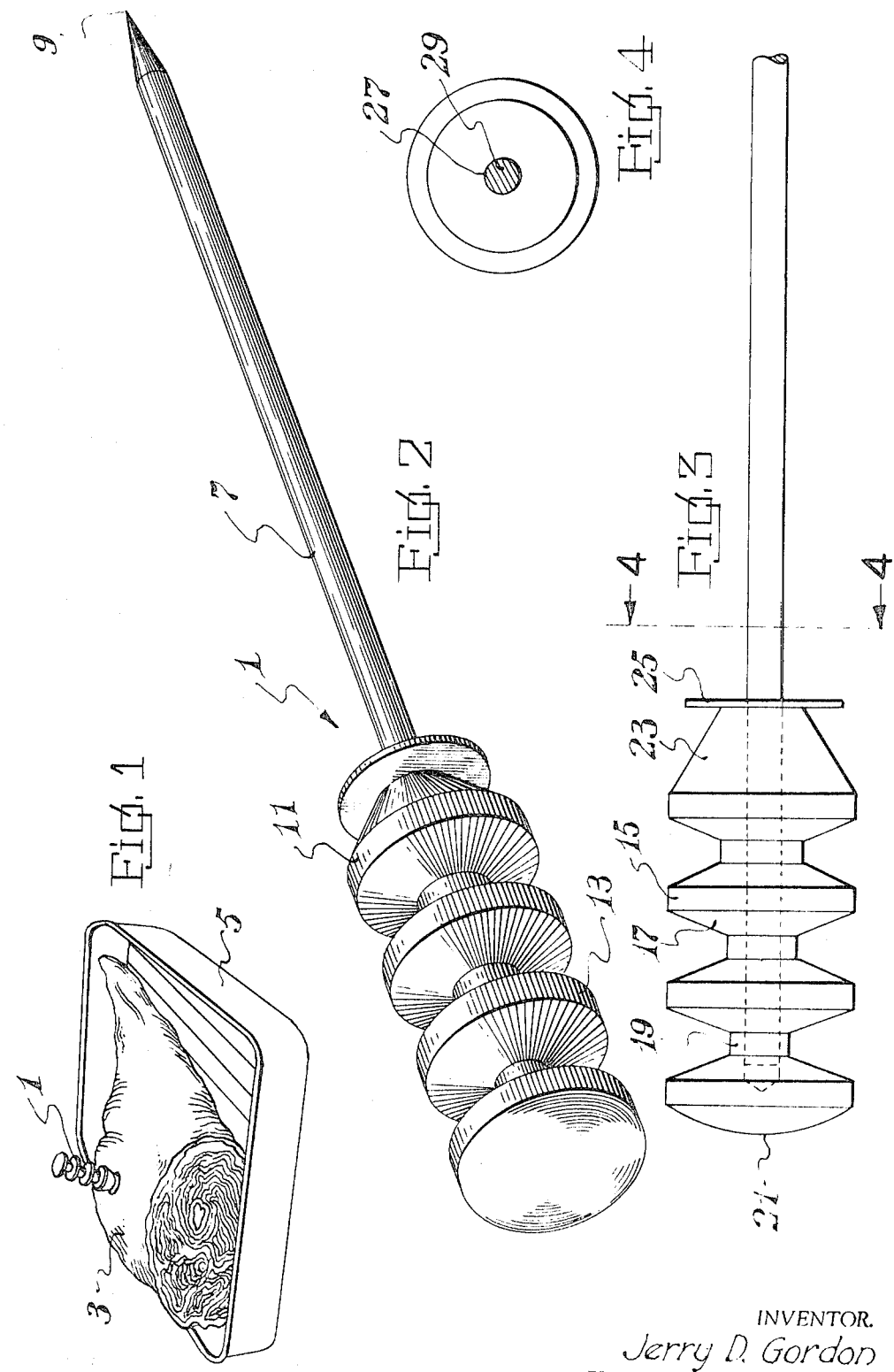

THERMAL SPIKE

The present invention relates to thermal spikes of the type that are inserted into large roasts or hams or other thick cuts of meat, for the purpose of improving heat conduction to the interior of the meat so as to cook the meat more uniformly throughout.

It is an object of the present invention to provide a thermal spike having improved heat transfer characteristics.

Another object of the present invention is the provision of a thermal spike which can be readily inserted into and removed from the meat.

Still another object of the present invention is the provision of a thermal spike having not only good heat transfer characteristics but also noncorrosive properties.

Finally, it is an object of the present invention to provide an improved thermal spike which will be relatively simple and inexpensive to manufacture, easy to use and to clean, and rugged and durable.

Other objects and advantages of the present invention will become apparent from a consideration of the following description, taken in connection with the accompanying drawing, in which:

FIG. 1 is a perspective view of an oven-ready roast, showing the position therein of a thermal spike according to the present invention;

FIG. 2 is an enlarged perspective view of the spike;

FIG. 3 is a side elevational view of the spike with the point broken away; and

FIG. 4 is a cross-sectional view taken on the line 4-4 of FIG. 3.

Referring now to the drawing in grater detail, there is shown a spike according to the present invention, indicated at 1, inserted in a roast 3 lying in a pan 5, so that the roast is oven ready. In the heated air of the oven, the exposed or protruding portions of the thermal spike will become heated, and the heat will be transferred axially of the spike into the interior of the roast.

Referring now to the larger scale figures, it will be noted that spike 1 is comprised of two principal portions: an internal spike portion 7 that is of uniform diameter along most of its length and that terminates in a point 9, and an external or protruding spike portion 11 which remains outside the meat during cooking and which receives heat by radiation and conduction in the oven and transmits it by an internal conduction to portion 7 and thence to the interior of the meat. To this end, portion 11 is provided with a series of coaxial equally spaced discs 13 of equal diameter such of which terminates in a cylindrical outer contour 15 and has conically radially inwardly tapering sidewalls 17, that taper down to a hub portion 19 whose outer contour is cylindrical. The end disc 13 has a spherically rounded end surface 21 against which the heel of the user's hand can be pressed to force the spike into the meat.

It is particularly to be noted that hub portions 19 are of progressively increasing diameter from the free end of portion 11 toward the inner or pointed end of the spike. The principal purpose of this feature is to increase the least cross-sectional configuration of the spike in a direction toward the meat, while at the same time maintaining a maximum surface area of external portion 11 so as to promote maximum heat transfer to that portion from the oven. Thus, the heat received by only the end disc is conveyed by the hub portion 19 nearest that end; while the heat received by the last two discs is transmitted by the next and larger hub portions; and the heat received by the three end discs is conducted by the next and still larger hub portion 19. In this way, the heat flow per unit area of the cross section of the spike tends to be uniform and hence optimal, because a desirably high-temperature differential is maintained between all parts of external portion 11 and the ambient.

The disc 13 nearest the pointed end of the spike tapers toward that pointed end in a relatively gently inclined conical sidewall 23 which terminates in a limiting washer 25 which is of a greater diameter than the least diameter of sidewall 23 and thus projects radially outwardly a substantial distance beyond the adjacent end of sidewall 23 on all sides thereof. The purpose of washer 25 is not only to regulate the depth of penetration of the spike, but also to ensure that no portion of sidewall 23 comes into contact with the meat. The reasons for this is that the external portion 11 can be cast or machined or otherwise formed form, say, aluminum without a corrosion-resistant coating, so as to promote optimum heat transfer from the ambient into external portion 11.

The inner portion 7 of the spike, however, is clad with a stainless steel sheath 27, so as to prevent the corrosion thereof and the transfer of corrosion products to the meat at the high temperatures involved. The inner portion 7 is comprised largely by a core 29 of a highly heat-conductive metal such as copper, which quickly and easily conducts heat the full length of inner portion 7.

The heat-exchange relationships of the various parts of the spike will now become apparent. All the heat input into the meat is concentrated at the juncture between inner and outer portions 7 and 11 of the spike, at the place surrounded by the washer 25. However, this is not undesirable from a heat transfer standpoint, because under the circumstances of the present invention, it is unobjectionable to have a heat concentration at this point. This is because the highly conductive core 29 of inner portion 7 ensures that the temperature along the entire length of inner portion 7 will be substantially uniform. Core 29 of portion 7 cooperates with the poorly conductive stainless steel sheath 27 thereon in such a way that the stainless cladding prevents too great a loss of heat to the meat in the outer portions of the meat, thereby ensuring that a desirably high-temperature differential between the spike and the meat will be maintained even at the pointed end of the spike, which may be the point of deepest penetration into the meat. In other words, the stainless steel cladding on the highly conductive core of portion 7 acts in effect as a heat valve and a heat distributor to prevent localized overheating of the surface of portion 7 which is in contact with the meat.

As is indicated in FIG. 3 in phantom line, the external portion 11 is desirably tapped axially over most of its length with the inner portion 7 screw-threaded or force fitted or brazed therein, so as to enlarge the interface between the two portions of the spike thereby to promote maximum heat transfer to portion 7. At least a portion of that part of portion 7 which is thus received in the tapped bore of portion 11 in direct heat-exchange relationship therewith is preferably not clad with stainless steel, so as to improve the heat transfer from portion 11 to core 29.

In view of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. A thermal spike for conducting heat to the interior of a piece of meat while cooking the same, comprising an elongated metal member having a sharp point at one end, the end of the spike opposite said sharp point protruding from the meat and having a series of axially spaced discs thereon disposed in planes perpendicular to the length of the spike, and hubs spacing said discs apart, said hubs increasing progressively in external diameter toward said sharp point.

2. A thermal spike as claimed in claim 1, said elongated member comprising a stainless steel sheath on a core of metal whose coefficient of heat transfer is substantially higher than that of stainless steel.

3. A thermal spike as claimed in claim 1, said discs having cylindrical outer contours coaxial with the spike and tapered sidewalls that increase in thickness toward the center of each disc.

4. A thermal spike as claimed in claim 1, the disc farthest from said sharp point having a convexly rounded surface directed away from the point of the spike.